US009425927B2

(12) United States Patent
Siomina et al.

(10) Patent No.: US 9,425,927 B2
(45) Date of Patent: Aug. 23, 2016

(54) SYSTEMS AND METHODS FOR CONFIGURING TRANSMISSIONS IN A WIRELESS NETWORK

(71) Applicant: TELEFONAKTIEBOLAGET L M ERICSSON (PUBL), Stockholm (SE)

(72) Inventors: Iana Siomina, Solna (SE); Shaohua Li, Beijing (CN); Muhammad Kazmi, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 154 days.

(21) Appl. No.: 14/385,520

(22) PCT Filed: Mar. 16, 2013

(86) PCT No.: PCT/IB2013/052116
§ 371 (c)(1),
(2) Date: Sep. 16, 2014

(87) PCT Pub. No.: WO2013/136315
PCT Pub. Date: Sep. 19, 2013

(65) Prior Publication Data
US 2015/0043415 A1 Feb. 12, 2015

(30) Foreign Application Priority Data
Mar. 16, 2012 (WO) ................ PCT/CN2012/072429

(51) Int. Cl.
*H04W 72/04* (2009.01)
*H04L 1/18* (2006.01)
(Continued)

(52) U.S. Cl.
CPC .............. *H04L 1/189* (2013.01); *H04J 11/005* (2013.01); *H04L 1/1854* (2013.01);
(Continued)

(58) Field of Classification Search
CPC ..... H04J 11/005; H04L 12/1877; H04L 1/1854; H04L 1/1887; H04L 1/189; H04L 2001/125; H04L 5/0032; H04L 5/0053; H04L 5/0055; H04L 5/0073; H04W 24/02; H04W 24/10; H04W 4/06; H04W 4/08; H04W 72/005; H04W 72/0413; H04W 72/042; H04W 72/0426; H04W 72/082
USPC ........................................................ 370/312
See application file for complete search history.

(56) References Cited

U.S. PATENT DOCUMENTS 9,225,450 B2 * 12/2015 Seo .................... H04W 24/00
2011/0116437 A1 * 5/2011 Chen .................. H04B 7/0689
370/312

(Continued)

FOREIGN PATENT DOCUMENTS

EP 2451234 A2 * 5/2012 ........ H04W 72/1263

OTHER PUBLICATIONS

R4-115130, Further considerations on ABS pattern design, NEC, Zhuhai, Oct. 10-14, 2011.

(Continued)

Primary Examiner — Chi H Pham
Assistant Examiner — Robert Lopata

(57) ABSTRACT

A method for configuring a wireless transmission includes obtaining, at a first network node serving a first cell, information pertaining to a type of an almost blank subframe (ABS) configuration to be used in a second cell. The method also includes determining based on the obtained information a transmission configuration for a downlink control channel carrying feedback information for one or more wireless communication devices in one or more candidate subframes in a restricted measurement pattern. The transmission configuration comprises transmission power level, transmission format, or both. The method also includes transmitting feedback information for an uplink transmission to said one or more wireless communication devices using the determined transmission configuration.

28 Claims, 10 Drawing Sheets

(51) Int. Cl.
*H04L 5/00* (2006.01)
*H04L 12/18* (2006.01)
*H04W 24/10* (2009.01)
*H04W 72/08* (2009.01)
*H04W 4/08* (2009.01)
*H04W 72/00* (2009.01)
*H04W 4/06* (2009.01)
*H04W 24/02* (2009.01)
*H04J 11/00* (2006.01)
*H04L 1/12* (2006.01)

(52) U.S. Cl.
CPC .......... *H04L 1/1887* (2013.01); *H04L 5/0032* (2013.01); *H04L 5/0053* (2013.01); *H04L 5/0055* (2013.01); *H04L 5/0073* (2013.01); *H04W 12/1877* (2013.01); *H04W 4/06* (2013.01); *H04W 4/08* (2013.01); *H04W 24/02* (2013.01); *H04W 24/10* (2013.01); *H04W 72/005* (2013.01); *H04W 72/042* (2013.01); *H04W 72/0413* (2013.01); *H04W 72/082* (2013.01); *H04L 2001/125* (2013.01); *H04W 72/0426* (2013.01)

(56) References Cited

U.S. PATENT DOCUMENTS

| | | | |
|---|---|---|---|
| 2011/0250919 A1 | 10/2011 | Barbieri | |
| 2012/0113812 A1* | 5/2012 | Ji | H04W 72/1263 370/241 |
| 2012/0314665 A1* | 12/2012 | Ishida | H01Q 21/28 370/329 |
| 2013/0210422 A1* | 8/2013 | Pani | H04W 8/02 455/423 |
| 2013/0223366 A1* | 8/2013 | Papasakellariou | H04W 72/042 370/329 |
| 2013/0260763 A1* | 10/2013 | Bhattad | H04W 36/0088 455/436 |
| 2013/0279343 A1* | 10/2013 | Jeong | H04W 24/10 370/241 |
| 2013/0303199 A1* | 11/2013 | Siomina | H04W 64/00 455/456.5 |
| 2013/0315087 A1* | 11/2013 | Zhang | H04W 24/10 370/252 |
| 2014/0036706 A1* | 2/2014 | Mondal | H04W 24/08 370/252 |
| 2014/0126530 A1* | 5/2014 | Siomina | H04W 52/146 370/330 |
| 2014/0226554 A1* | 8/2014 | Wang | H04L 5/005 370/312 |
| 2014/0254537 A1* | 9/2014 | Kim | H04J 11/005 370/329 |
| 2014/0341057 A1* | 11/2014 | Seo | H04W 24/10 370/252 |
| 2015/0029988 A1* | 1/2015 | Chai | H04W 72/0426 370/329 |
| 2015/0043469 A1* | 2/2015 | Kim | H04B 7/26 370/329 |
| 2015/0208262 A1* | 7/2015 | Siomina | H04W 64/00 370/252 |
| 2015/0289234 A1* | 10/2015 | Zhao | H04L 1/1861 370/329 |

OTHER PUBLICATIONS

Huawei: "Enhanced ICIC for control channels to support HetNet", 3GPP Draft; R1-103126 Enhanced ICIC for Control Channels to Support Hetnet, 3rd Generation Partnership Project (3GPP), Mobile Competence Centre ; 650, Route Des Lucioles ; F-06921 Sophia-Antipolis Cedex; France, val. RAN WG1, No. Montreal, Canada; 20100510-20100514, May 4, 2010, [retrieved on May 4, 2010].

Catt: "Performance Analysis in Macro-Pico with RE", 3GPP Draft; R1-105184, $3^{rd}$ Generation Partnership Project (3GPP), Mobile Competence Centre; 650, Route Des Lucioles; F-06921 Sophia-Antipolis Cedex; France, vol., RAN WG1, No. Xi'an; 20101011. Oct. 5, 2010, XP050450402, the whole document.

Motorla Mobility: "DL Performance results for eICIC", 3GPP Draft; R1-112439_EICIC-, $3^{rd}$ Generation Partnership Project (3GPP) Mobile Competence Centre; 650, Route Des Lucioles; F-06921 Sophia-Antipolis Cedex; France. vol. RAN WG1, No. Athens, Greece; 20110822. Aug. 16, 2011 XP050537540, the whole document.

* cited by examiner

FIGURE 3

SYSTEMS AND METHODS FOR CONFIGURING TRANSMISSIONS IN A WIRELESS NETWORK

CLAIM OF PRIORITY

The present application claims the benefit of PCT Patent Application Serial No. PCT/CN2012/072429, filed on Mar. 16, 2012, entitled Methods for Reliable Reception of HARQ Feedback Information in Heterogeneous Deployments, the disclosure of which is incorporated herein in its entirety by reference.

TECHNICAL FIELD OF THE INVENTION

This disclosure relates in general to wireless communication and, more particularly, to improving the reliability of wireless transmissions.

BACKGROUND OF THE INVENTION

The dramatic increase in the use and availability of communication services in recent years has placed significantly greater demands on wireless communication networks. Continually increasing requirements for coverage, throughput, and reliability have driven many developments in the design and configuration of wireless networks. One example of this has been the development of "heterogeneous" networks in which conventional macro-cell base stations are supplemented by the deployment of various types of "low-power" nodes that provide lower maximum transmission power levels than conventional macro-cell base stations. These low power nodes are often smaller and cheaper, both to manufacture and to operate, than conventional macro-cell access nodes.

Heterogeneous deployments provide a mechanism for increasing network densities and for adapting to changes in traffic needs and operating environment. However, heterogeneous deployments bring unique challenges that may hinder efficient network operation and degrade user experience. The reduced transmission power typically associated with low-power nodes can result in an increased sensitivity to interference. Additionally, the mix of large and small cells in a heterogeneous deployment can lead to other challenges, as a result of the asymmetric power capabilities of the different cells. As a result, there is a need tot effective solutions to reduce inter-cell interference in heterogeneous deployments and other advanced networks.

SUMMARY OF THE INVENTION

In accordance with the present disclosure, certain disadvantages and problems associated with wireless communication have been substantially reduced or eliminated. In particular, certain devices and techniques for providing wireless telecommunication service are described.

In accordance with one embodiment of the present disclosure, a method for configuring a wireless transmission includes obtaining, at a first network node serving a first cell, information pertaining to a type of an almost blank subframe (ABS) configuration to be used in a second cell. The method also includes determining based on the obtained information a transmission configuration for a downlink control channel carrying feedback information for one or more wireless communication devices in one or more candidate subframes in a restricted measurement pattern, wherein the transmission configuration comprises transmission power level, transmission format, or both. The method also includes transmitting feedback information for an uplink transmission to said one or more wireless communication devices using the determined transmission configuration.

Important technical advantages provided by certain embodiments of the present disclosure include improved reliability in wireless communications. Particular embodiments may be capable of reducing inter-cell interference experienced by wireless communication devices, especially in heterogeneous networks. Such embodiments may be capable of reducing the number of erroneous transmissions and/or increasing the likelihood that wireless transmissions will be successfully received. Additionally, in particular embodiments, the reduction in interference can be achieved with minimal impact on the throughput of the interfering cell. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a diagram showing possible MBSFN-configurable subframes according to an example frame configuration;

DETAILED DESCRIPTION OF THE INVENTION

Figure 1A:
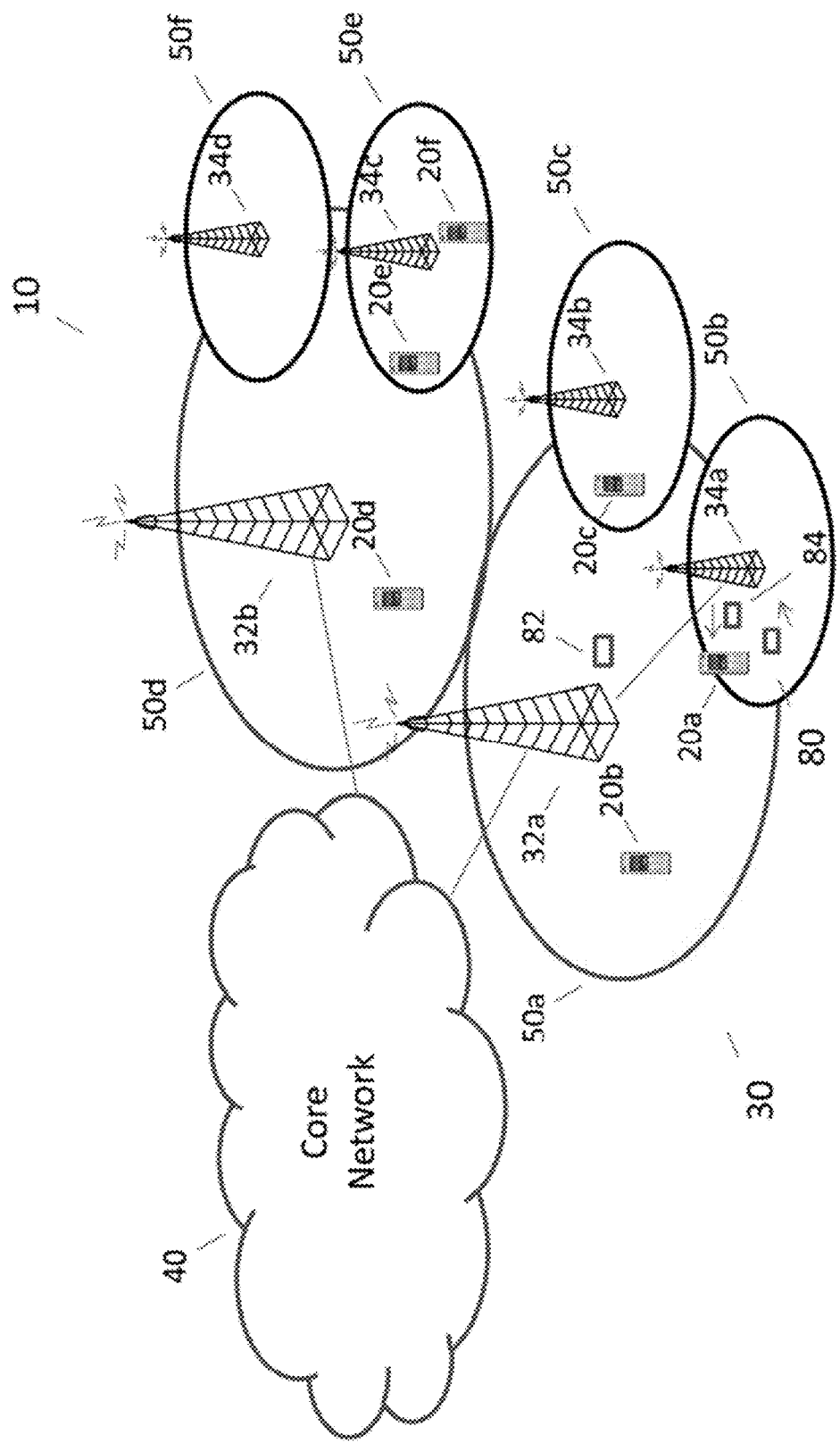
FIGS. 1A-1C illustrate particular embodiments of a wireless communication system in which the described solutions may be implemented.

FIG. 1A illustrates a wireless communication system 10 that provides communication service to one or more wireless communication devices 20. Wireless communication system 10 includes an access network 30 that provides wireless access to communication services within a particular geographic area and a core network 40 that provides backhaul delivery of information within wireless communication system 10. Access network 30 includes multiple radio access nodes including, in certain embodiments, multiple different types of radio access nodes (e.g., both base stations 32 and low-power nodes 34). Each radio access node serves one or more cells 50. Because of the close proximity (and potential overlap) of the cells 50, a wireless communication device 20 operating in a first cell 50 (referred to herein as a "victim cell") may suffer interference due to transmissions occurring in a second cell 50 (referred to herein as an "aggressor cell") that is overlapping or near to the victim cell. This aggressor cell may be served by the same radio access node as the victim cell or by a different radio access node.

Additionally, as noted above, access network 30 may represent a heterogeneous network in which radio access nodes transmitting at different power levels are deployed. This may create more severe interference problems, especially when the victim cell is served by a radio access node using a higher power than the radio access node serving the interfering cell—e.g., for FIG. 1A, in situations in which the victim cell is served by one of low-power nodes 34 and the aggressor cell is served by one of base stations 32.

Figure 1B:
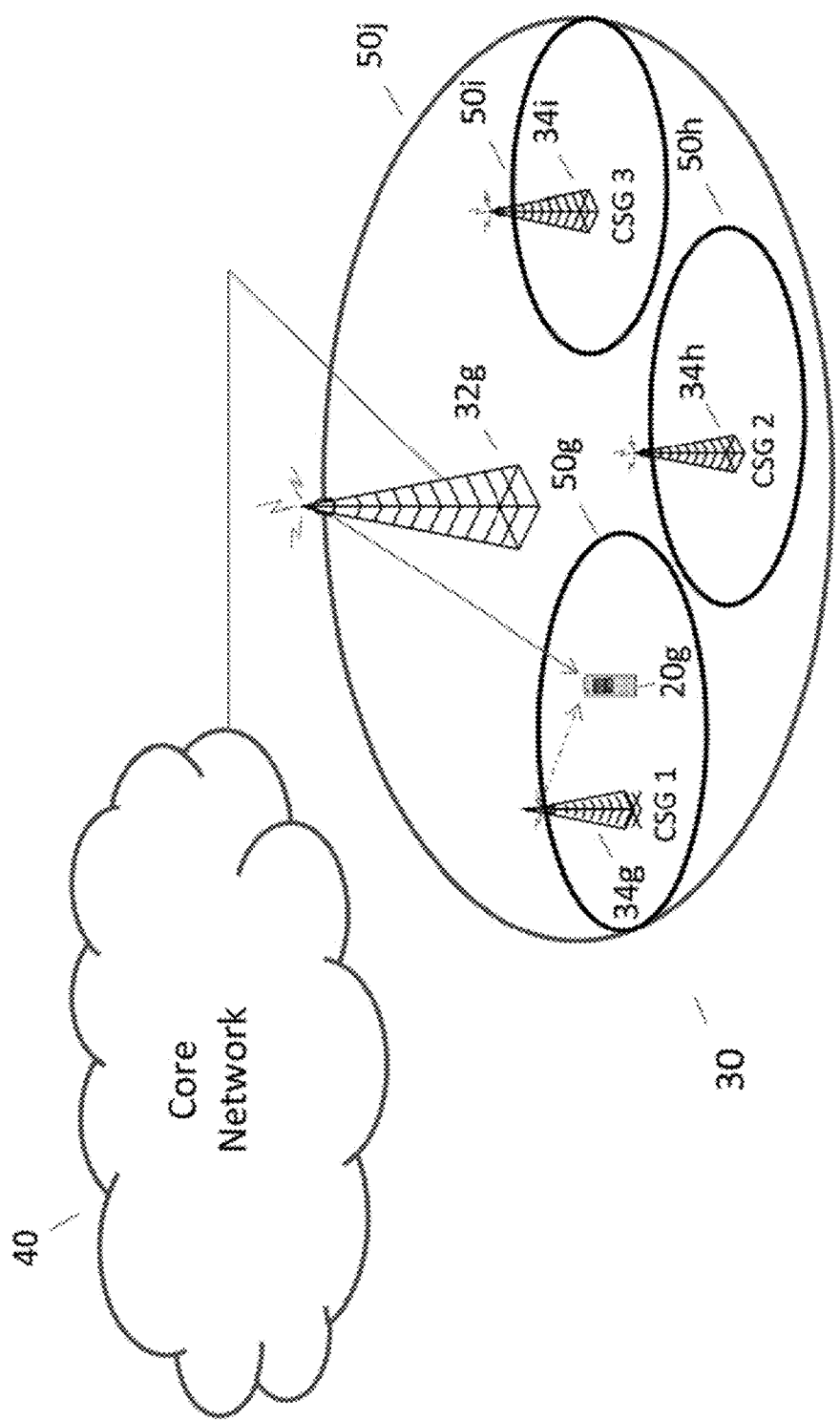

These interference problems may be even further exacerbated by certain solutions that are commonly implemented in heterogeneous networks that utilize certain types of low-power nodes 34. For example, FIG. 1B illustrates problems that may arise in certain embodiments of wireless communication system 10 when one or more low-power nodes 34 are configured to utilize closed subscribed groups (CSGs). In the example of FIG. 1B, one or more low-power nodes 34 are configured to utilize a CSG. The use of CSGs may allow low-power nodes 34 to limit access to their services to certain authorized users that are part of a "closed subscriber group." A radio access node configured with a CSG will provide communication services to wireless communication devices 20 that are members of the CSG, but deny service to wireless communication devices 20 that are not members of that node's CSG. For example, a picocell operated by an employer to provide service for its employees in their workplace could be configured with a CSG that includes the wireless communication devices 20 of all the company's employees. By using the CSG, this low-power node 34 could provide additional or better service coverage to the company's employees beyond that provided by nearby base stations 32 but may still prevent non-employees in the area from tying up the picocell's transmission, reception, or processing resources.

Thus, non-CSG wireless communication devices 20 that are operating in a cell 50 served by a CSG low-power node 34 cannot utilize CSG low-power node 34, even though the CSG low-power node 34 may be the closest radio access node. On the other hand, wireless transmissions made by the CSG low-power node 34 may still interfere with communications between these non-CSG wireless communication devices 20 and other radio access nodes serving them. Moreover, non-CSG wireless communication devices 20 may be located extremely close to the CSG low-power node 34 despite being unable to obtain service from the CSG low-power node 34, which may result in a significant amount of interference for the non-CSG wireless communication devices 20. For instance, in the example shown in FIG. 1B, it is assumed that wireless communication device 20g is not a member of the CSG served by low-power node 34g and cannot obtain service from low-power node 34g. Instead, wireless communication device 20g is served by base station 32g in cell 50j. As a result, cell 34g served by CSG low-power node 34g may act as an aggressor cell while wireless communication device 20 is operating in the portion of cell 50j that overlaps cell 34g. The interference from this aggressor cell 50g may be extremely high wireless communication device 20g is operating very close to low-power node 34g.

Figure 1C:
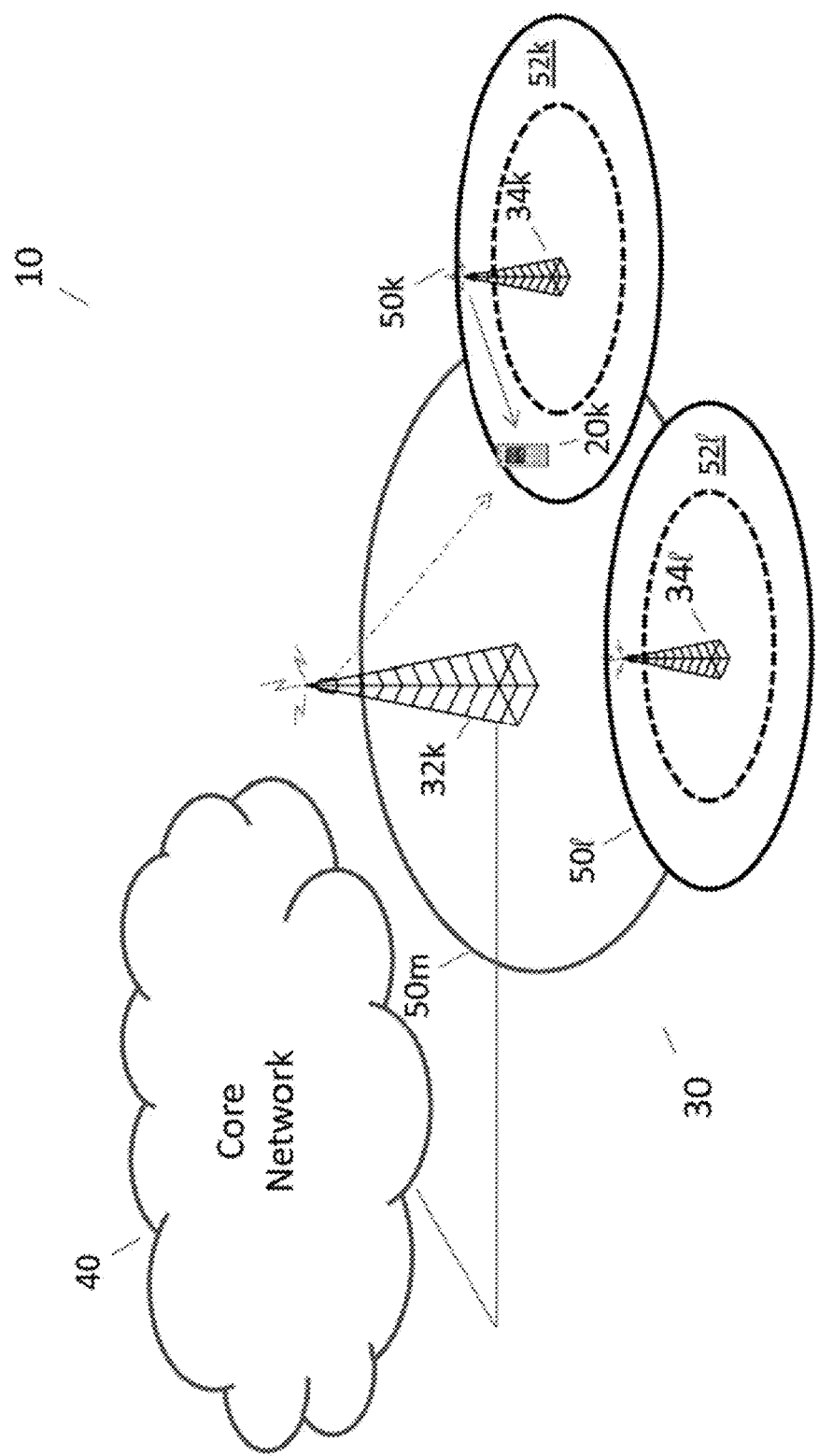

Another interference problem that may arise, especially in heterogeneous networks, relates to the use of "cell range expansion" for "cell range extension") (CRE) zones. FIG. 1C illustrates an example in which one or more low-power nodes 34 are configured to support CREs. In CREs, cell selection/re-selection diverges from a conventional signal-strength-based (e.g., RSRP-based) approach towards, for example, a pathloss- or pathgain-based approach, thereby extending the coverage of the lower-power cell to include additional areas (represented by CRE zones 52 in FIG. 1C). The larger a particular CRE zone 52 is, the weaker serving cells signal strength will be near its boundary. This may result in nearby macro cells acting as aggressor cells to wireless communication devices 20 operating in a CRE zone 52. For example, in FIG. 1C, cell 50m served by base station 32k may act as an aggressor cell for wireless communication device 20k operating in CRE zone 52k of low-power node 34k. Thus, in general, as shown by FIGS. 1A-1C inter-cell interference can be a significant concern in wireless communication systems, particularly in those implementing heterogeneous deployments.

It may be critical to protect certain types of signaling from such inter-cell interference. For example, certain embodiments of wireless communication system 10, such as those supporting LTE, may utilize Hybrid-Automatic Repeat reQuest (HARQ) functionalities for transmission error correction. In particular embodiments, HARQ functionality provides an N-process Stop-And-Wait mechanism that transmits and retransmits transport blocks. Upon reception of a transport block, the receiver makes an attempt to decode the transport block and informs the transmitter about the outcome of the decoding operation by transmitting feedback information (e.g., a single-bit acknowledgement (ACK) for successful reception or negative acknowledgement (NAK) for unsuccessful reception) indicating whether the decoding was successful and/or whether a retransmission of the transport block is required. If interference from an aggressor cell prevents feedback information of this type from being successfully transmitted, a significant number of unnecessary retransmissions may occur and/or erroneously received transmissions may never be retransmitted.

Additionally, HARQ may also be used for contention-based random access transmissions, both for a first scheduled uplink transmission (e.g., for initial access, after handover, or upon RRC connection reestablishment) and for contention resolution in downlink (where HARQ feedback is transmitted only by the wireless communication device 20 which detects its own identity, as provided in message 3, echoed in a Contention Resolution message). HARQ failure in the first uplink transmission step or in the contention resolution step may result, for example, in a cell radio network temporary identity (C-RNTI) detection failure by the relevant wireless communication device 20 or erroneous assignment of the same C-RNTI also to another wireless communication device 20.

Figure 4:
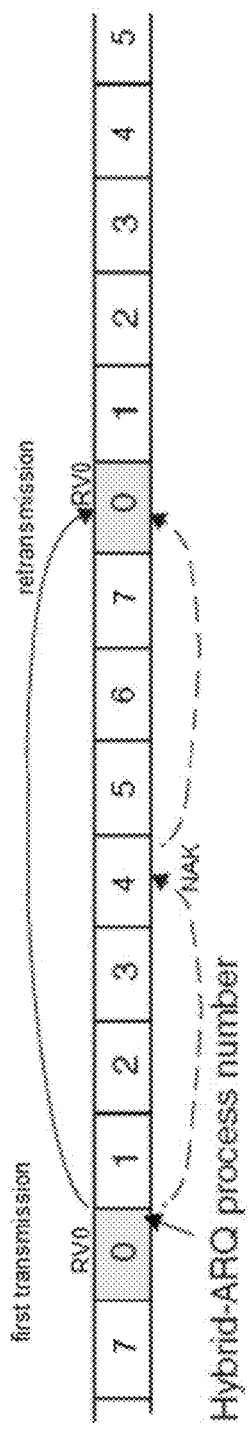
FIG. 4 illustrates timing for Hybrid-Automatic Repeat reQuest (HARQ) signaling according to an example HARQ scheme.

Certain embodiments of wireless communication system 10 utilize "synchronous HARQ" for some or all of their transmissions. For example, LTE implementations use synchronous HARQ for uplink user data transmissions on the Uplink Shared CHannel (UL-SCH), providing HARQ feedback information in the downlink on a Physical Hybrid-ARQ Indicator CHannel (PHICH). Synchronous HARQ involves synchronous HARQ feedback and synchronous retransmissions. In such embodiments, the time instants for downlink transmissions of feedback information and any uplink retransmissions are fixed based on the subframe(s) scheduled for the uplink transmissions and known to both the radio access node and the relevant wireless communication device 20. Consequently, there may not be any need to signal a HARQ process number when operating in this HARQ mode. The maximum number of retransmissions may be configured per wireless communication device 20. An example of synchronous HARQ operation is shown in FIG. 4.

In particular embodiments of wireless communication system 10, transmissions in aggressor cells may be constrained by predetermined transmission patterns that limit downlink transmissions made by the radio access nodes serving those cells. These transmission patterns may limit the time and/or frequency resources that are used for making downlink transmissions in the relevant cell. As a result, these transmission patterns may provide a victim cell protection from interference by an aggressor cell in other time and/or frequency resources.

For example, wireless communication system 10 may configure radio access nodes to utilize Almost Blank Subframe (ABS) patterns that result in these radio access nodes transmitting a minimal amount of signaling during certain subframes. In particular embodiments, ABS patterns define low-power and/or low-transmission activity subframes (e.g., subframes in which a reduced number of modulation symbols are transmitted or some other reduction in the amount of data or signaling occurs) for the relevant cell 50. For example, an ABS pattern for a potential aggressor cell may specify a number of subframes during which no user data is transmitted in the aggressor cell, although control channel information may still be transmitted during the relevant subframes. In particular embodiments, ABS patterns may be exchanged between radio access nodes (e.g., via an X2 interface).

Furthermore, in particular embodiments, the inter-cell interference caused by an aggressor cell may be significantly reduced during those ABS subframes that are also configured as Multicast and Broadcast Single Frequency Network (MBSFN) subframes. In certain embodiments, MBSFN subframes are divided into a non-MBSFN region and an MBSFN region. For example, the non-MBSFN region may span the first one or two orthogonal frequency division multiplexing (OFDM) symbols in an MBSFN subframe with the length of the ion-MBSFN region being 1 or 2 symbols (e.g., one symbol may be used with 1 or 2 cell-specific ports when the number of DL resource blocks exceeds 10). In such embodiments, the MBSFN region in an MBSFN subframe may then be defined as the OFDM symbols that do not make up part of the non-MBSFN region. While some MBSFN subframes may carry multicast transmissions, such as Physical Multicast Channel (PMCH) transmission, not all MBSFN subframes include such transmissions, despite their name. MBSFN subframes without multicast transmissions are referred to herein as "blank MBSFN subframes."

Figures 2A, 2B:
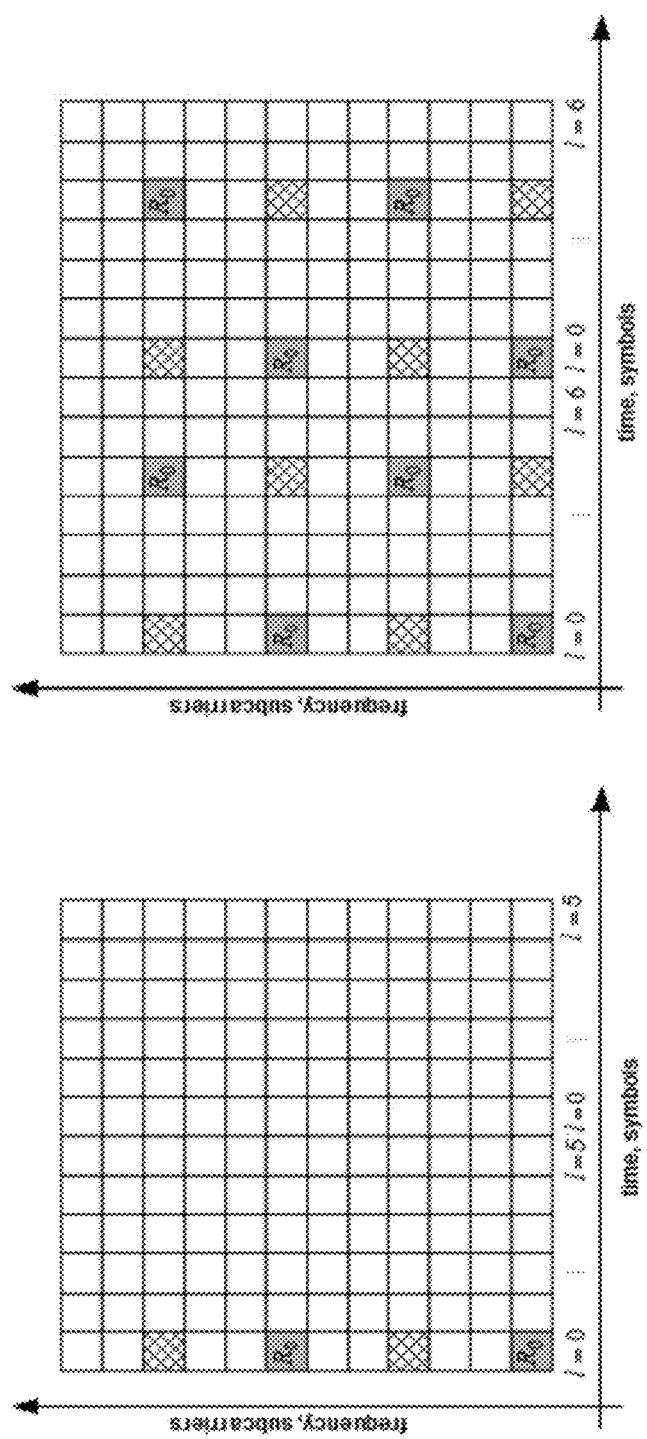
FIGS. 2A and 2B illustrate example transmission patterns for a subframe configured as, respectively, a Multicast and Broadcast Single Frequency Network (MBSFN) Almost Blank Subframe (ABS) subframe and a non-MBSFN ABS subframe.

Nonetheless, even in blank MBSFN subframes, certain types of signaling may still be transmitted in part of the non-MBSFN region. For example, in LTE networks, common reference signals (CRS) may still be transmitted in the non-MBSFN region of the of blank MBSFN subframes, namely in the first symbol. However, unlike ABS configured in non-MBSFN subframes (a "non-MBSFN ABS configuration"), ABS configured in blank MBSFN subframes (an "MBSFN ABS configuration") may result in less inter-cell interference due to the fact that certain information (e.g., CRS in LTE networks) is not transmitted in the MBSFN region of MBSFN subframes. A subframe diagram for an example MBSFN ABS configuration that may be used in particular embodiments of wireless communication system 10 is schematically illustrated in FIG. 2A, while a subframe diagram for an example non-MBSFN ABS configuration that may be used in particular embodiments is schematically illustrated in FIG. 2B. In the examples of FIGS. 2A and 2B, it is assumed that two transmit antenna ports are used for CRS with transmissions shown for the first port (marked with "R0") and the second port (marked with crosshatching). As can be seen from FIGS. 2A and 2B, when a potential aggressor cell is configured with MBSFN ABS, transmissions will occur in fewer symbols per subframe than with non-MBSFN ABS, resulting in less overall interference from an aggressor cell configured with MBSFN ABS.

Figure 3:
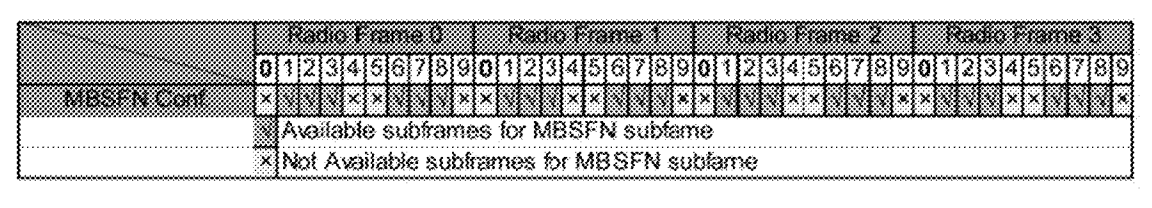

However, not all downlink (DL) subframes may be MBSFN-configurable. FIG. 3 shows an example of how MBSFN configuration is constrained under the 3GPP TS 36.331 specification for Long Term Evolution (LTE) networks when FDD is utilized. As shown in FIG. 3, MBSFN cannot be configured in Subframes #0, #4, #5, or #9 in an FDD system, since some system information may need to be transmitted in these subframes. Thus, in such embodiments, only Subframes #1, #2, #3, #6, #7, and #8 can be configured as MBSFN subframes. By contrast to the FDD constraints shown in FIG. 3, in TDD LTE systems, only Subframes #3, #4, #7, #8, and #9 can be configured for MBSFN. While it might be possible to use a mixture of MBSFN and non-MBSFN ABS to protect more subframes mixing MBSFN and non-MBSFN ABS subframes can produce other problems, such as inaccurate cell state information reports, less efficient demodulation algorithms for wireless communication devices 20 with advanced receivers, unnecessary constraints on network configuration, and reduced throughput in the aggressor cell. Additionally, some of the available MBSFN subframes may need to be used for purposes other than interference cancellation. As a result, wireless communication system 10 may not have enough MBSFN cells available for ABS to protect all the downlink subframes in the victim cell that it is necessary or desirable to protect. This means that MBSFN subframes can only be used to reduce interference at certain times and, in particular embodiments, the time periods that can be protected may change from network to network.

Thus, constraints on how aggressor cell transmission patterns can be configured may make it impossible to protect all the necessary transmission resources in the victim cell from interference using a transmission pattern such as an MBSFN ABS pattern. For example, assume the HARQ timing in a particular embodiment of wireless communication system 10 is based on an 8 ms periodicity, which is consistent with the HARQ periodicity set for LTE. If an uplink grant is first allocated in subframe n, HARQ feedback information (e.g., an ACK/NAK indication) will be sent on the PCICH channel of subframes (n+8k) mod(10), where k is any positive integer value and mod(.) is the modulus after division. When n is an odd number. Subframes 1, 9, 7, 5, and 3 will have ACK/NAK information for the corresponding HARQ process. In this case, although Subframe 9 and 5 would need protection, these subframes would not MBSFN-configurable in the example illustrated by FIG. 3. When n is an even number, downlink HARQ feedback information will be transmitted in Subframes 0, 8, 6, 4, and 2 for the corresponding HARQ process. In this case, Subframes 0 and 4 need protection, but are not MBSFN-configurable either under the example of FIG. 3.

Figure 5:
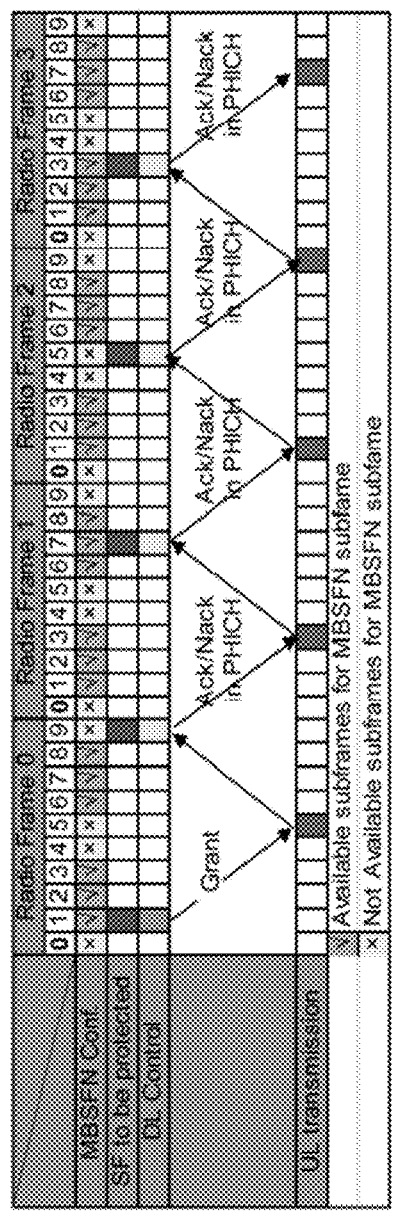
FIG. 5 illustrates the timing of HARQ signaling under the example HARQ scheme relative to that of an example Almost Blank Subframes (ABS) pattern that may be used to protect downlink transmissions.

To illustrate how this may cause problems, FIG. 4 illustrates timing for a HARQ signaling sequence under an example HARQ scheme, while FIG. 5 shows the timing of HARQ signaling under the example HARQ scheme relative to that of an example Almost Blank Subframes (ABS) pattern. More specifically, FIG. 4 illustrates HARQ signaling for an example HARQ scheme that is synchronous. Under a synchronous HARQ scheme, the timing relationship between the uplink data transmission and the downlink feedback transmission and/or any possible retransmissions may be fixed. For instance, in the example shown in FIG. 4, a wireless communication device 20 transmits an uplink data transmission during a particular subframe and the radio access node serving this wireless communication device 20 transmits a responsive HARQ feedback transmission a fixed number of subframes after the uplink transmission. In the illustrated example, the HARQ feedback transmission is made 4 subframes after the corresponding uplink transmission, and the HARQ round trip time (RTT) is 8 subframes. Because the MBSFN ABS configuration used in an aggressor cell may not match an 8 subframe periodicity (as shown, for example, by FIG. 3), the subframes during which a responsive downlink transmission might occur could include subframes that are unprotected, or that receive less protection, by the ABS configuration of an aggressor cell.

An example of such a scenario is shown in FIG. 5. In particular, FIG. 5 shows an example of the timing relationship between the HARQ signaling that may occur in a victim cell and a possible ABS configuration in an aggressor cell. It may be necessary to protect the PHICH transmission in the victim cell with ABS subframes in the aggressor cell or some other mechanism if a wireless communication device 20 in the victim cell is going to have any chance of successfully receiving and decoding the PHICH transmissions. In the example of FIG. 5, the subframes in a victim cell that require protection by MBSFN ABS subframes in the aggressor cell are shown in the row labeled "SF to be protected." As FIG. 5 illustrates, under this example configuration, Sublime #9 of Radio Frame #0 and Subframe #5 of Radio Frame #2 cannot be protected with MBSFN ABS subframe, since MBSFN cannot be configured in these subframes in this example. Consequently, only some of the resulting PHICH transmissions can be protected by MBSFN ABS subframes and without more, some PHICH transmissions will not be detected reliably due to the configuration constraints for MBSFN subframes. As shown by FIG. 5, depending on the type of ABS configuration used, an ABS configuration in the aggressor cell may not be a sufficient mechanism for protecting all subframes in which a PHICH transmission or another type of downlink transmission must occur in the victim cell.

This is an example of a more generic problem that may occur in particular embodiments as a result of a mismatch in the periodicity of the relevant downlink transmissions (e.g., HARQ feedback information transmitted on PHCIH) and that of a transmission pattern (e.g., an MBSFN ABS pattern) that provides appropriate interference conditions to protect downlink transmissions in the victim cell. While it may be possible to protect some of the downlink transmissions in a victim cell by simply taking advantage of an ABS pattern or other transmission pattern configured for the aggressor cell it may not be possible to protect all downlink transmissions made in the victim cell in this manner, especially for certain types of ABS configurations. In general, when there is a restriction (e.g., due to subframe type such as MBSFN/non-MBSFN, cyclic prefix configuration, interference conditions, network configuration, device activity state) on the time and/or frequency resources that can be protected from interference by the aggressor cell and at the same time there are predetermined time occasions when certain downlink transmissions need to occur in the victim cell (e.g., due to the timing constraints of synchronous HARQ), these predetermined time occasions may not fully encompass all of the subframes that could possibly be needed for downlink transmissions. Therefore, in embodiments of wireless communication system 10 that exhibit a periodicity mismatch between a pattern of subframes that can be interference-protected and the downlink transmissions that require such protection, it may be impossible to protect all downlink transmissions needing protection without additional measures being taken.

Thus, while MBSFN ABS may provide effective interference protection for downlink feedback transmissions made during subframes configured as MBSFN ABS, configuration restrictions may make it impossible for all subframes to be protected using MBSFN ABS. Moreover, there are drawbacks to mixing MBSFN ABS with non-MBSFN ABS configurations. As a result, even when MBSFN ABS is used in an aggressor cell, signaling in subframes that cannot be configured as MBSFN ABS may still be lost or received erroneously.

To remedy this problem, particular embodiments of wireless communication system 10 may modify the transmission configuration used for certain downlink transmissions in a victim cell when certain types of ABS configurations (e.g., MBSFN ABS) are used in an aggressor cell. In particular embodiments, the modifications to the transmission configuration may include adjustments to a transmission power for the relevant downlink transmissions, a transmission format, or both. As explained in further detail below, this may increase the chances that the downlink transmissions are successfully received even when these transmissions do not align with the MBSFN ABS subframes in the aggressor cell.

In particular embodiments, the downlink transmissions may be intended to be made during one or more candidate subframes in a restricted measurement pattern that satisfies a candidate condition that relates to transmissions in the ABS of the second cell. In particular embodiments, these candidate subframes may represent subframes in which transmissions by base station 32a in the aggressor cell are limited in some way (e.g., the subframes configured as ABS subframes under the ABS configuration), subframes in which low-power node 34a or access network 30 has designated as being acceptable for certain or all interference sensitive operations (e.g., the subframes identified by a restricted measurement pattern configured for wireless communication device 20a), or some combination of the two. Alternatively, in some embodiments, the candidate subframes may depend on an ability of the wireless communication device 20 to handle high-interference associated with transmissions in the aggressor cell and/or a receiver type for a receiver of wireless communication device 20 (e.g., an indication of its ability to handle or mitigate certain types of interference). More generally, the candidate subframes may represent any subframes that satisfy a candidate condition that relates in any suitable manner to transmissions in an aggressor cell during the relevant subframes.

Additionally or alternatively, in some embodiments, the downlink transmissions may need to be transmitted in at least one subframe that does not align with or otherwise overlap any protected subframes (e.g., any ABS subframes in the second cell) that might otherwise provide interference protection. In such embodiments, the use of the transmission configuration described here nay be especially beneficial.

Returning now to the example embodiment shown in FIG. 1A, the illustrated embodiment of wireless communication system 10 provides wireless communication service to one or more wireless communication devices 20 operating within a plurality of cells 50 served by wireless communication system 10. Wireless communication system 10 may support communication of any suitable type and/or in accordance with any appropriate communication standards including, but not limited to, any Long Term Evolution (LTE), Worldwide Interoperability for Microwave Access (WiMAX), and Wideband Code Division Multiple Access (WCDMA) communication standards.

Wireless communication device 20 represents any device capable of communicating information wirelessly with wireless communication system 10. Examples of wireless communication device 20 include traditional communication devices such as wireless phones, personal digital assistants ("PDAs"), laptop computers, and any other portable communication device suitable for use with communication system 10. For example, in particular embodiments, wireless communication device 20 represents an instance of LTE user equipment (UE). Additionally, in particular embodiments, wireless communication device 20 may also represent automated equipment or devices capable of machine-type communication (MTC). For example, wireless communication device 20 may represent a wireless meter or sensor, a digital billboard, a wireless-capable appliance (e.g., a washing machine, furnace, digital video recorder (DVR)), or any other device capable of wireless communication with access network 30.

Access network 30 communicates wirelessly with wireless communication devices 20 and serves as an interface between wireless communication devices 20 and core network 40. Access network 30 may represent or include a radio access network and/or any elements responsible for providing a radio or air interface for core network 40. Access network 30 includes one or more radio access nodes capable of communicating wirelessly with wireless communication devices 20. In the example embodiment of FIG. 1A, these radio access nodes include a plurality of base stations 32 and low-power nodes 34. Access network 30 may also include base station controllers, access servers, gateways, relays, repeaters, and/or any additional components suitable for managing radio channels used by base station 32, authenticating users, controlling handoffs between base station 32 and other radio access elements, and/or otherwise managing the interoperation of base stations 32 and interfacing base stations 32 with core network 40.

In particular embodiments, access network 30 may represent a heterogeneous network in which multiple different types of radio access nodes are deployed. For example, in the illustrated, example of FIG. 1A, access network 30 includes a plurality of base stations 32 that each serve one or more cells 50 and a plurality of low-power nodes 34 that each serve one or more cells. For purposes of this description, cells 50 served by base stations 32 are referred to as "macro" cells, while cells 50 served by low-power stations 34 are referred to as "micro" cells. In particular embodiments, micro-cells served by low-power stations 34 may substantially overlap one or more macro-cells served by nearby base stations 32, as shown in FIG. 1A.

Base stations 32 communicate wirelessly with wireless communication devices 20 to facilitate wireless communication service for wireless communication devices 20. Base stations 32 may include any appropriate elements to communicate with wireless communication devices 20 and to interface wireless communication devices 20 with core network 40. For example, depending on the communications standards supported by access network 30 and core network 40, each base station 32 may represent or include a base station, a Node B, an evolved Node B (eNode B), a radio base station (RBS), or any other suitable element capable of communicating with wireless communication devices 20 wirelessly.

Similarly, low-power nodes 34 communicate wirelessly with wireless communication devices 20 to facilitate wireless communication service for wireless communication devices 20. Low-power nodes 34 may also include any appropriate elements to communicate with wireless communication devices 20 and to interface wireless communication devices 20 with core network 40. In particular embodiments, low-power nodes 34 may have a lower maximum transmission power than base stations 32, or may be configured to use lower transmission powers than base stations 32. Examples of low-power nodes 34 include, but are not limited to, pico base stations, femto base stations, micro base stations, home eNodeBs (HeNBs), and wireless local access network (WLAN) access points.

Although referred to as being "low-power," low-power nodes 34 may, in particular embodiments, include identical physical components to base stations 32 but, at a given time, may be simply configured to operate differently from base stations 32. Furthermore, although the description below focuses, for purposes of example, on embodiments in which access network includes radio access nodes that differ in terms of transmission power, other embodiments of access network 30 may include differing types of radio access nodes that differ in regards to other aspects of their operations and/or other capabilities or characteristics. Moreover, alternative embodiments of access network 30 may represent homogeneous networks in which all of the radio access nodes are similar or identical.

Each radio access node in access network 30 is associated with one or more cells 50 that are served by that radio access node. Cells 50 may define an approximate geographical area served by the corresponding radio access node. For purposes of simplicity, FIG. 1A illustrates an example embodiment in which each radio access node is configured to serve a single cell 50. However, in particular embodiments, the radio access nodes may be capable of supporting multiple different cells 50. For example, in embodiments that support carrier aggregation or other multicarrier features, a particular radio access node may serve multiple different cells 50, possibly with identical geographic coverage, with each of the cells 50 served by that radio access node using a carrier from a different portion of the frequency spectrum. As a result, in particular embodiments, a first cell 50 and a second cell 50 may both be served by the same radio access node, and those cells 50 may cover identical, overlapping, or completely distinct geographical areas.

Core network 40 routes voice and/or data communicated by wireless communication devices 20 from access network 30 to other wireless communication devices 20 or to other communication devices coupled to core network 40 through landline connections or through other networks. Core network 40 may support any appropriate standards or techniques for routing such communications. For example, in embodiments of wireless communication devices 20 that support LTE, core network 40 may represent a System Architecture Evolution (SAE) core network. Core network 40 may also be responsible for aggregating communication for longhaul transmission, authenticating users, controlling calls, metering usage for billing purposes, or other functionality associated with providing communication services. In general, however, core network 40 may include any components suitable for routing and otherwise supporting voice and/or data communications for wireless communication devices 20.

In operation, radio access nodes of wireless communication system 10 (such as base stations 32 and low-power nodes 34 in the example embodiment) provide wireless communication service to wireless communication devices 20 operating in the cells 50 served by these radio access nodes. To help protect downlink transmissions in neighboring cells from inter-cell interference, a radio access node (here, base station 32a of FIG. 1A) of wireless communication system 10 may be configured with a transmission pattern that constrains downlink transmissions in cells 50 served by the relevant radio access nodes. In particular embodiments, this transmission pattern may involve one or more subframes being configured as MBSFN ABS subframes.

Base station 32a may transmit coordination information to a potential victim cell (here, low-power node 34a) indicating an ABS configuration, or another type of transmission pattern, used in cell 50a. In particular embodiments, the coordination information may specifically identify the subframes configured as ABS in cell 50a and/or the type of ABS subframes to be used (e.g., MBSFN). While the use of ABS subframes or another suitable transmission pattern in an aggressor cell may improve the interference conditions in a victim cell, limitations on the subframes that can be used in particular types of ABS configuration result in this being an incomplete solution. Transmissions occurring in subframes that cannot be configured as ABS subframes for the relevant type of ABS configuration may receive little or no protection under this scheme. For example, subframes that cannot be configured as MBSFN subframes may receive no protection under an MBSFN ABS configuration.

As a result, particular embodiments of wireless communication system 10 are configured to supplement the use of ABS subframes in an aggressor cell with modifications to a transmission configuration used for downlink transmissions in the victim cell. These modifications may relate to the transmission power, the transmission format, or both. Consequently, low-power node 34a may be configured to modify its transmission configuration in light of coordination information received from base station 32a.

Because the described techniques may be most beneficial when used with particular types of ABS configurations in the aggressor cell, low-power node 34 may first determine a type of ABS configuration used by base station 32a. In certain embodiments of wireless communication system 10, low-power node 34a may only apply the techniques described herein if base station 32a is using a particular type of ABS configuration (e.g., an MBSFN ABS configuration). Thus, in particular embodiments, low-power node 34a may first determine whether a particular type of ABS configuration is being used by base station 32a in cell 50a based on the coordination information.

Additionally, in certain embodiments, low-power node 34a may only apply the described techniques for downlink transmissions to wireless communication devices 20 that have been configured with restricted measurement patterns. Therefore, when configuring downlink transmissions to a particular wireless communication device 20 (here, wireless communication device 20a), low-power node 34a may also determine whether that wireless communication device 20 has been configured to perform at least one measurement in accordance with a restricted measurement pattern.

If base station 32a is using a particular type of ABS configuration (e.g., MBSFN ABS) in the aggressor cell and wireless communication device 20 is configured with a restricted measurement pattern, then low-power node 34a may decide to supplement the interference protection provided by the ABS configuration by applying power boosting to the downlink transmission and/or by using a more robust transmission format than low-power node 34a might otherwise. As a result, low-power node 34a may determine, based on the ABS configuration of base station 32, an appropriate transmission configuration for a downlink transmission to wireless communication device 20a to further protect the downlink transmission from inter-cell interference.

In particular embodiments, low-power node 34a may be configured to apply power boosting to the downlink transmission if the above conditions are satisfied, and thus, Thus, in such embodiments, determining the transmission configuration may involve determining a transmission power level for the downlink transmission. For example, low-power node 34a may determine a positive power margin for the downlink channel based on the type of ABS configuration being used by base station 32a in cell 50a. In particular embodiments, low-power node 34a may determine the positive power margin by estimating or otherwise determining an amount of power above a reference transmission power that will be necessary to ensure that wireless communication device 20a successfully receives (e.g., fully receives and successfully decodes). Moreover, in particular embodiments, low-power node 34a determines the amount necessary to ensure successful receipt based on the type of ABS configuration used in the aggressor cell, as indicated by the coordination information.

In particular embodiments, low-power node 34a may be configured to apply a special transmission format for more robust transmissions if the above conditions are satisfied. Thus, in such embodiments, determining the transmission configuration may involve determining a transmission format for the downlink transmission based on the ABS configuration. More specifically, low-power node 34a may select a format that is less susceptible to inter-cell interference or a format that is otherwise more robust when the above conditions are satisfied.

As one example, low-power node 34a may modify the number of channels in a channel group for the channel that will be used to make the downlink transmission. For instance, the downlink transmission may represent a downlink feedback transmission to be made on a feedback channel (e.g., a PHICH). This feedback channel may represent one of several feedback channels transmitted by low-power node 34a, and low-power node 34a may group the feedback channels in multiple groups for transmission and multiplex the channels in each group for transmission. Thus, in such embodiments, determining a transmission format may involve changing the number of channels multiplexed in each group and/or increasing the number of channel groups. By lowering the number of channels in each multiplexed group, low-power node 34a may be able to make the transmission format more resistant to interference from the aggressor cell.

As another example, in particular embodiments, low-power node 34a may modulate the downlink transmission based on a spreading factor associated with the transmission. In such embodiments, low-power node 34a may modify a spreading factor size used to modulate a channel that will be used to make the downlink transmission based on the type of ABS configured in the aggressor cell. In such embodiments, determining a transmission format may involve determining the spreading factor size for the downlink transmission. By increasing the spreading factor size when a particular type of ABS configuration is used in the aggressor cell, low-power node 34a may be able to make the transmission format more resistant to interference from the aggressor cell.

As another example, in particular embodiments, low-power node 34a may use a variable number of modulation symbols (e.g., a variable number of orthogonal frequency division modulation symbols) to carry the downlink transmission. In such embodiments, determining a transmission format may involve determining a number of modulation symbols to carry the downlink transmission. For example, in particular embodiments, low-power node 34a may switch from using 2 OFDM symbols to using 3 OFDM symbols to modulate the downlink transmission when the aggressor cell is configured when MBSFN ABS is configured in the aggressor cell. By increasing the number of modulation symbols used to carry the downlink transmission, low-power node 34a may be able to make the transmission format more resistant to interference from the aggressor cell.

Although the above examples focus on embodiments in which the downlink transmission represents a transmission on a feedback channel, the relevant downlink transmission may comprise any type of control information or user data and/or be transmitted on any type of channel. For example, in particular embodiments, the downlink transmission may represent a Physical Downlink Control CHannel (PDCCH) transmission. In such embodiments, low-power node 34a may adjust the number of control channel elements (CCE), the modulations and coding scheme (MCS), the coding rate, and/or other aspects of its configuration to make the transmission format more resistant to interference from the aggressor cell.

In particular embodiments, low-power node 34 may additionally limit use of the above techniques for adapting its downlink transmission configuration to situations in which the interference warrants use of more drastic measures. Thus, in particular embodiments, low-power node 34 may also determine whether one or more interference conditions related to the amount of interference experienced by wireless communication device 20a are satisfied before adapting its transmission configuration. In such embodiments, if the interference condition is not satisfied, low-power node 34a may elect not to adapt its transmission configuration to the ABS configuration in the aggressor cell.

The interference condition may relate in any appropriate way to the actual or anticipated interference experienced by wireless communication device 20a. For example, the interference condition may relate to whether wireless communication device 20 is operating in a cell range expansion (CRE) zone of the victim cell (as in the example of FIG. 1C), operating in a cell served by a radio access node associated with a closed subscriber group (CSG) to which wireless communication device 20a is not a member (as in the example of FIG. 1B), detecting interference from the aggressor cell above a certain threshold level (based on measurements performed by wireless communication device 20a or low-power node 34a itself), or otherwise is experiencing interference that warrants use of the above techniques.

After deciding whether to adapt its transmission configuration for the relevant downlink transmission based on the ABS configuration of base station 32a, low-power node 34 may additionally configure wireless communication device 20a or other radio access nodes in access network 30 based on its adapted transmission configuration. For example, low-power node 34a may transmit configuration information to wireless communication device 20a indicating the transmission configuration to be used by low-power node 34a for the relevant downlink transmissions. This configuration information may be specific to a particular transmission or may apply to all downlink transmissions, or all downlink transmissions of a particular type (e.g., all PHICH transmissions), made by low-power node 34a to wireless communication device 20a. The configuration information may indicate the relevant transmission format or transmission power, and wireless communication device 20a may configure itself to receive downlink transmissions according to the indicated transmission format or at the indicated transmission power.

Additionally, base station 32a may modify its own transmission configuration based on coordination information received from low-power node 34a. In particular embodiments, base station 32a may modify the same or similar type of transmission parameters as those set by low-power node 34a (e.g., PHICH group numbers, number of OFDM symbols used for PHICH, number of CCEs used for PDCCH) to further reduce the interference impact of transmissions in the aggressor cell. Base station 32a may also adapt other parameters related to base station 32a, such as a cell identifier associated with base station 32a (e.g., to adjust its PHICH position), or related to wireless communication devices 20 served by base station 32a, such as a cell radio network temporary identity (C-RNTI) (e.g., to adjust the position of the PDCCH for that device), to better coordinate the operation of base station 32a with low-power node 34a and to reduce interference in the victim cell.

Furthermore, base station 32a may refine its original ABS configuration. For example, in particular embodiments, the received coordination information provides an indication of the transmission and/or interference protection needs of the victim cell, and base station 32a may increase or decrease the number of ABS subframes configured in the aggressor cell based on this information. In certain embodiments, the coordination information may represent a request from low-power node 34a that base station 32a change its ABS configuration because no transmission configuration that low-power node 34 could use would adequately protect the subframes intended to be protected. For example, if low-power node 34 cannot sufficiently boost the transmission power so that all (or a threshold number or percentage) of the wireless communication device 20 it serves can reliably receive downlink transmissions in the victim cell under the original ABS configuration, low-power node 34a may request that base station 32a change its ABS configuration. Base station 32a may then change its ABS configuration appropriately (e.g., by changing from an MBSFN to a non-MBSFN configuration, by adding, additional ABS subframes).

After any appropriate configuration of low-power node 34 and other elements of wireless communication system 10, low-power node 34a may begin making downlink transmissions in accordance with the optimized transmission configuration. As explained above, the downlink transmissions may represent any suitable type of control information or user data.

In particular embodiments, the downlink transmissions represent feedback transmissions (e.g., HARQ transmissions) carrying feedback information (e.g., ACK/NAK bits) indicating whether a scheduled uplink transmission by wireless communication device 20a was successfully received by low-power node 34a. Therefore, in such embodiments, low-power node 34a schedules wireless communication device 20a to make an uplink transmission, and responds to the uplink transmission with a downlink feedback transmission that is transmitted using a transmission configuration (e.g., the transmission power and/or transmission format) selected as described above. If low-power node 34a is configured to use a synchronous type of feedback scheme, low-power node 34a may be required to transmit the responsive downlink transmission a fixed number of subframes after the uplink transmission is scheduled. In such embodiments, the timing requirement of the feedback scheme may force low-power node 34a to transmit the downlink feedback transmission during a subframe that is unprotected, or that receives less protection, from interference by the aggressor cell. Because the transmission power and/or transmission format is selected based on an awareness of the type of ABS configuration used by the aggressor cell, the transmission power and/or transmission format used by low-power node 34a may be sufficiently robust to overcome interference caused by the aggressor cell.

Consequently, selecting a transmission format and/or a transmission power according to the described techniques may allow a radio access node in a victim cell to successfully transmit downlinks transmissions even when the transmissions occur during subframes that are not protected by the ABS configuration of an aggressor cell causing interference in the victim cell. The described techniques may allow the victim cell to successfully transmit during any subframe, despite constraints on which subframes can be protected by the type of ABS configuration used in the aggressor cell. For example, if the aggressor cell is using an MBSFN ABS configuration, downlink transmissions may be made successfully in the victim cell even in subframes that cannot be configured as MBSFN subframes (such as subframes #0, #4, #5, and #9 in the example LTE FDD configuration of FIG. 3). Additionally, in particular embodiments, the victim cell may even be able to successfully transmit under circumstances that increase the vulnerability of the victim cell or the receiving device to interference, such as where an aggressor CSG cell overlaps the victim cell or the receiving device is located in a CRE of the victim cell. Thus, certain embodiments of wireless communication system 10 may provide numerous operational benefits. Nonetheless, specific individual embodiments of wireless communication system 10 may provide some none, or all of these benefits.

Figure 6A:
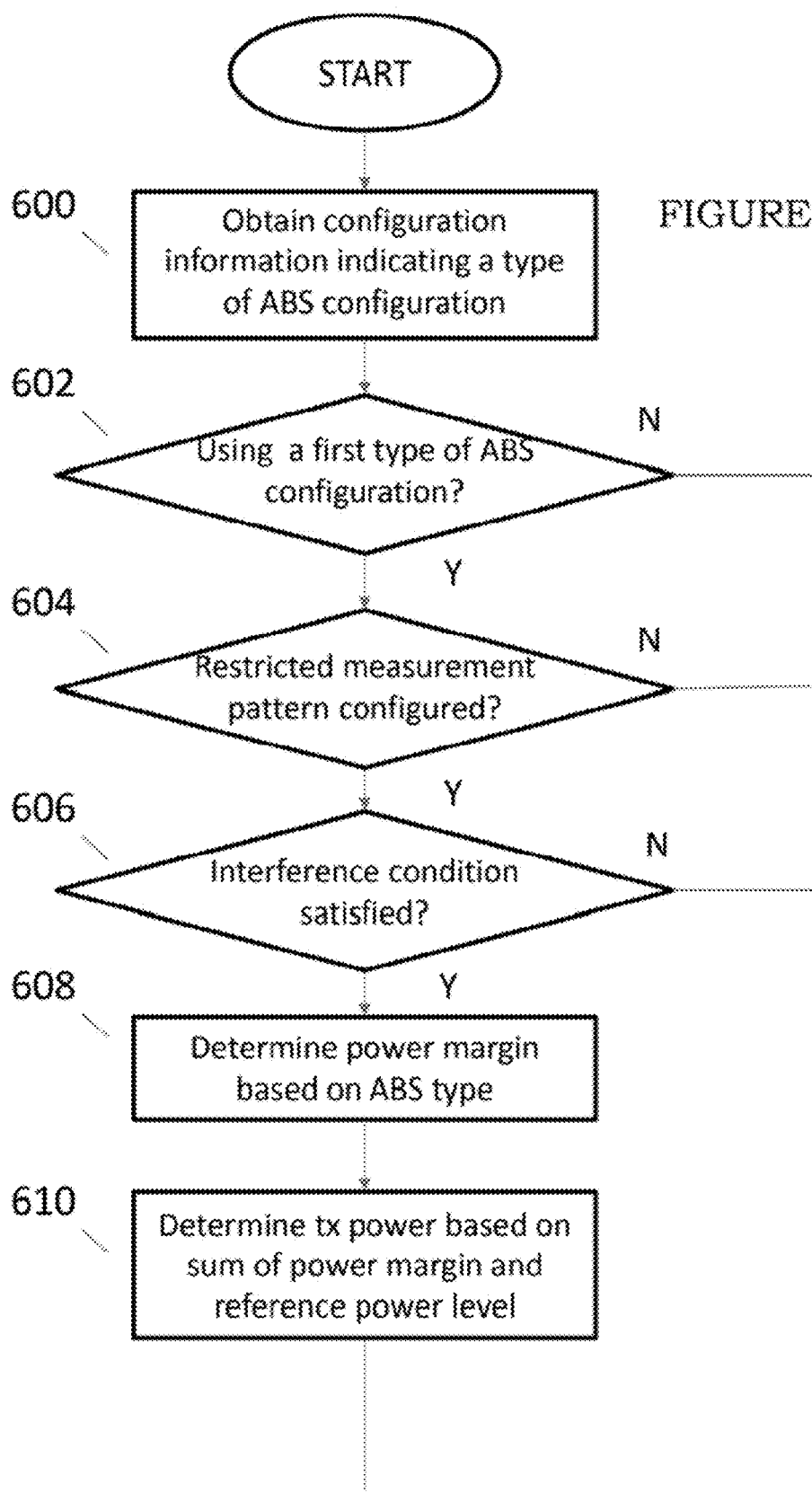
FIGS. 6A-6B provide a flow chart showing example operation of a particular embodiment of a radio access network node in determining a transmission configuration to use for certain downlink transmissions based on an ABS configuration of an interfering cell.
Figure 6B:
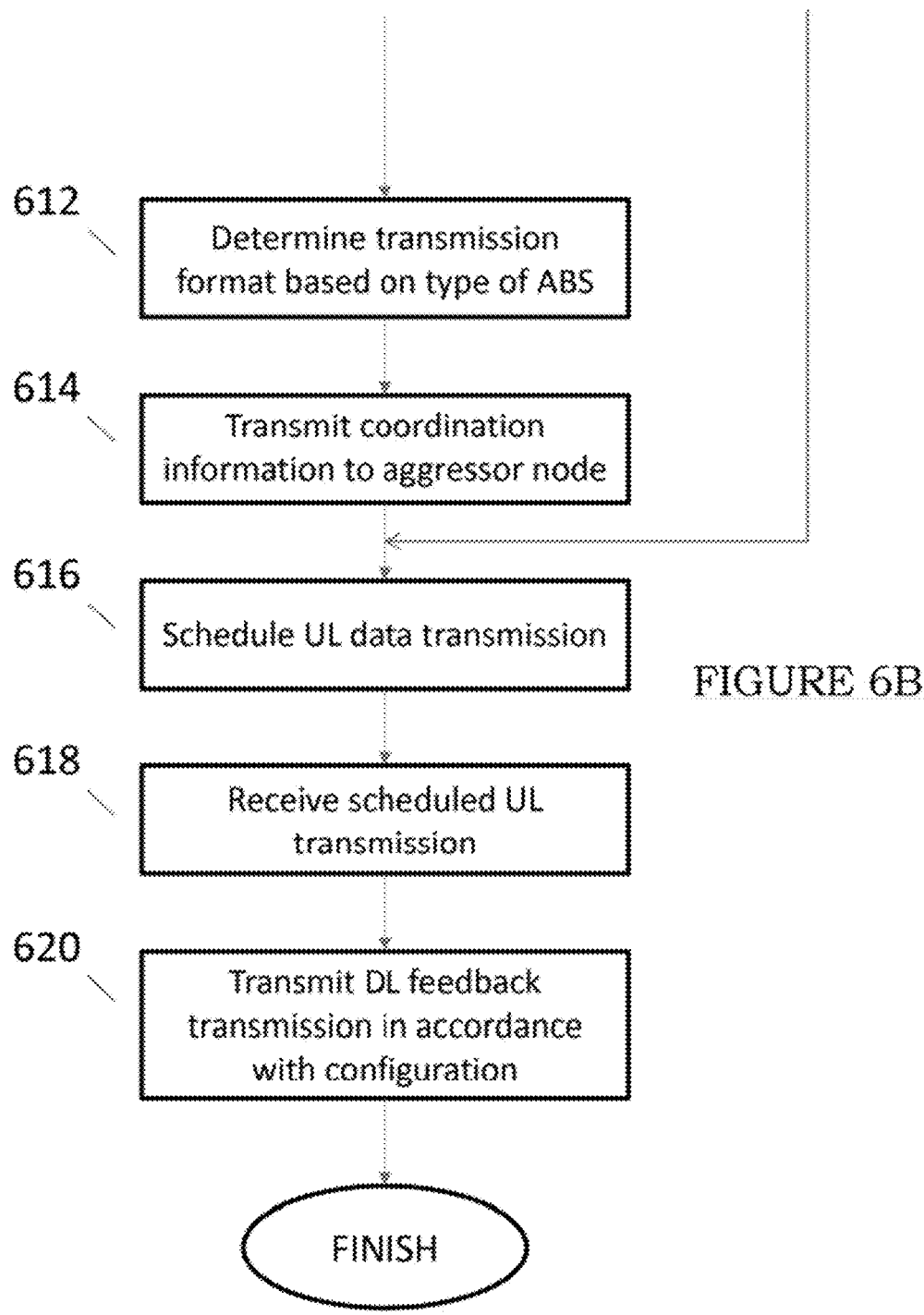

FIGS. 6A-6B are a flow chart illustrating example operation for a radio access node of access network 30 in determining an appropriate transmission configuration based on an ABS configuration of a potential aggressor cell. The steps illustrated in FIGS. 6A-6B may be combined, modified, or deleted where appropriate. Additional steps may also be added to the example operation. Furthermore, the described steps may be performed in any suitable order.

Operation begins in FIG. 6A with a radio access node (in this example, low-power node 34a of FIG. 1A) obtaining configuration information pertaining to a type of an almost blank subframe (ABS) configuration to be used by another radio access node (in this example, base station 32a), as step 600. The configuration information may indicate a type of ABS configuration (e.g., MBSFN or another specific type of ABS subframes) that base station 32a is configured to use in a potential aggressor cell.

In particular embodiments, low-power node 34a may determine whether low-power node 34a should set or adjust (e.g., switch from a current transmission configuration or a default transmission configuration that low-power node 34a would otherwise use) a transmission configuration for certain downlink transmissions in the victim cell to adapt to the type of ABS configuration used by base station 32a. Thus, low-power node 34a may determines whether base station 32a is using a particular type of ABS configuration (e.g., one with MBSFN ABS subframes, one with non-MBSFN ABS subframes) and only adapt its transmission configuration if base station 32a is using a particular type of ABS configuration. For example, in the illustrated example, low-power node 34a determines, at step 602, whether base station 32a is using an MBSFN ABS configuration and only adapts its transmission configuration if so. In the illustrated example, low-power node 34a also determines, at step 604, whether wireless communication device 20a has been configured to perform one or more measurements in accordance with a restricted measurement pattern. In particular embodiments, low-power node 34a may be responsible for configuring wireless communication device 20a with restricted measurement patterns, so this determination may be made when low-power node 34a initially configures wireless communication device 20a with a restricted measurement pattern.

Additionally, in particular embodiments, low-power node 34a may limit its use of the described techniques to situations in which the interference in the victim cell or the interference experienced by wireless communication device 20a warrants more significant interference protection measures. As a result, in the illustrated example, low-power node 34a determines, at step 606, whether an interference condition is satisfied before adapting its transmission configuration. If the interference condition is not satisfied, if wireless communication device 20a is not configured with a restricted measurement pattern, or if the type of ABS configuration used does warrant adaptation of the transmission configuration, low-power node 34a may instead use a previously configured transmission configuration or use conventional techniques for determining an appropriate transmission configuration and operation may advance to, for example, step 616.

If these conditions are satisfied in the illustrated example, however, low-power node 34a proceeds to determine a transmission configuration to use for certain downlink transmissions (in this example, for downlink HARQ feedback transmissions) based on the fact that base station 32a is using an MBSFN ABS configuration. In particular embodiments, these downlink transmissions may be transmitted during one or more candidate subframes in a restricted measurement pattern that satisfies a candidate condition that relates to transmissions in the ABS of the second cell. Additionally or alternatively, in some embodiments, the downlink transmissions may need to be transmitted in at least one subframe that does not align with a particular set of candidate subframes that might otherwise provide interference protection. In such embodiments, the use of the transmission configuration described here may be especially beneficial.

As explained above, determining the transmission configuration may involve one or both of determining a transmission power level and determining a transmission format to use for the relevant downlink transmissions based on the fact that base station 32a is using a specific type (here, MBSFN) of ABS configuration. In the illustrated example, low-power node 34a determines both a transmission power level, as shown in steps 608-610, and a transmission format, as shown at steps 612, for the relevant downlink transmission.

As part of determining a transmission power level, in the example embodiment, low-power node 34a determines, at step 608, a positive power margin for the downlink control channel based on the type of ABS configuration used or to be used by base station 32a in the aggressor cell. In particular embodiments, this positive power margin represents an amount of power boost estimated to be necessary for the downlink transmission to be successfully received (e.g., based on a desired signal to noise plus interference ratio (SINR) for the received signal) by wireless communication device 20a considering, for example, the ABS configuration and/or signal quality measurements by wireless communication device 20a. In certain embodiments, this margin will typically be in the range of +2 to +6 dB but this may vary depending on factors, such as the level of aggressor cell interference and the position of wireless communication device 20 within cell 50b. In the example embodiment, low-power node 34a then determines a transmission power level for the downlink transmission based on a sum of the power margin and a reference power level, at step 610.

At steps 612 in the example embodiment, low-power node 34a determines a transmission format for the downlink transmission based on the type of ABS configuration. In particular embodiments, this may involve low-power node 34a selecting a more robust transmission format based on the type of ABS configuration used by base station 32a. This may involve low-power node 34a determining a parameter for any aspect of the transmission to make the transmission more resistant to interference from the aggressor cell. As one example, the downlink transmission may represent a feedback channel (e.g., a PHICH) belonging to a feedback channel group (e.g., a PHICH group) with one or more similar feedback channels that, when transmitted, will be multiplexed with the other channels of its group. In such embodiments, low-power node 34a may select a more robust transmission format by changing the number of feedback channels included in each channel group. Other examples of how low-power node 34a may adjust the transmission format may involve low-power node 34a determining a spreading factor size for the downlink transmission, a number of OFDM symbols to use for the downlink transmission, a number of control channel elements (CCEs) to use, a modulation and coding scheme (MCS), and/or a coding rate for the downlink transmission.

In particular embodiments, low-power node 34a may transmit coordination information to base station 32a to allow base station 32a to coordinate its transmissions in a potential aggressor cell with the determined transmission configuration for low-power node 34a, as shown at step 614. In some embodiments, the coordination information may indicate a transmission power level and/or a transmission format that low-power node 34a selected for use in cell 50b based on the type of ABS configuration used by base station 32a. Alternatively or additionally, the coordination information may request a change to the ABS configuration used by base station 32a or to some other aspect of the transmission configuration used by base station 32a. For example, if low-power node 34a cannot sufficiently boost its power level to ensure reliable receipt of its downlink transmissions, the coordination information may request that base station 32a modify its ABS configuration (e.g., from an MBSFN ABS configuration to a non-MBSFN ABS configuration).

After low-power node 34a has determined a transmission configuration based on the ABS configuration of base station 32a, low-power node 34a may begin using the determined transmission configuration for downlink transmissions in the victim cell (here, cell 50b). The specific process for performing the downlink transmissions will depend on the relevant type of transmissions. An example of this process is shown in FIGS. 6A-6B in steps 616-620.

In the illustrated example, the downlink transmissions represent downlink feedback transmissions that carry feedback information pertaining to uplink data transmissions transmitted by wireless communication device 20a. Thus, in FIGS. 6A-6B, low-power node 34a schedules an uplink data transmission by wireless communication device 20a, at step 616, and receives (or fails to receive) the scheduled uplink data transmission, at step 618. In the illustrated example, a synchronous feedback scheme is used, and the downlink feedback transmission is made a fixed number of subframes (e.g., four subframes) after the uplink data transmission is scheduled to occur. Thus, at step 620, low-power node 34a transmits a responsive downlink feedback transmission in accordance with the determined transmission configuration, transmitting the downlink transmission at a transmission power level and/or with a transmission format determined based on the ABS configuration of base station 32a. Wireless communication device 20a may then respond to the feedback information as appropriate according to the selected feedback scheme.

In particular embodiments, the downlink feedback transmissions made by low-power node 34a to wireless communication device 20a occur during subframes designated for measurements in a restricted measurement pattern used by wireless communication device 20a. Because the designated subframes in the restricted measurement pattern may overlap with the subframes designated by the ABS configuration in the aggressor cell as ABS subframes, some of the downlink transmissions in the victim cell may occur during ABS subframes in the aggressor cell. However, in particular embodiments, low-power node 34a may need to make some of the downlink transmissions during subframes that are not configured as ABS subframes by the ABS configuration. Because the transmission power level and/or transmission format were selected to ensure reliable reception even during subframes that are not ABS subframes in the aggressor cell, the downlink transmission may still be successful even in these situations. Operation of low-power node 34a in configuring the relevant downlink transmissions may then end as shown in FIG. 6B.

Although FIGS. 6A-6B illustrate, for the sake of simplicity, an example in which low-power node 34a selects a feedback type for a single wireless communication device 20, low-power node 34a may, in particular embodiments, serve multiple different wireless communication devices 20 at any given time. In such embodiments, low-power node 34a may make a select a transmission configuration to use for all wireless communication devices 20 served by low-power node 34a (e.g., based on an interference condition that is not unique to individual wireless communication devices 20, such as the fact that low-power node 34a is a "low-power" node) or may repeat the selection process for other wireless communication devices 20 served by low-power node 34a.

For example, low-power node 34a may obtain information for each of multiple wireless communication devices 20 in regards to an interference condition(s) (e.g., in regards to whether each of the wireless communication devices 20 is operating within a CRE zone of cell 50b). In such embodiments, low-power node 34a may select a first transmission configuration to use in making downlink transmissions to a first group of wireless communication devices 20 for which the interference condition is satisfied and select a second transmission configuration for a second group of wireless communication devices for which the interference condition is not satisfied. Low-power node 34a may then transmit downlink feedback transmission to the first group of wireless communication devices 20 in accordance with the first transmission configuration and transmit feedback information to the second group of wireless communication devices 20 in accordance with the second transmission configuration. As a result, in such embodiments, low-power node 34a may be able to advantageously vary the transmission configuration used for different wireless communication devices 20 as appropriate.

Figure 7:
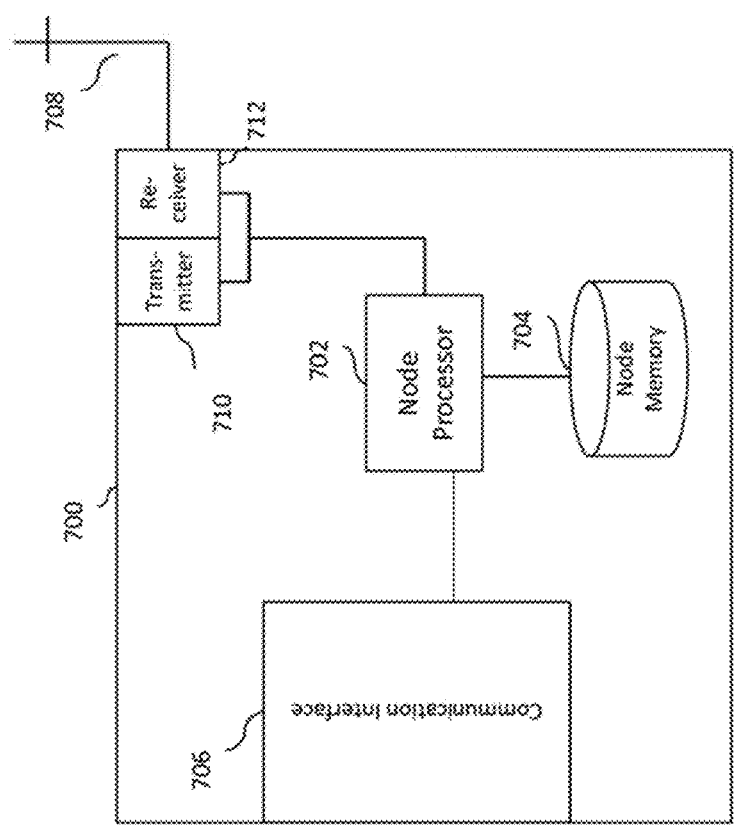
FIG. 7 is a block diagram illustrating the contents of an example embodiment of a radio access node.

FIG. 7 is a block diagram illustrating in greater detail the contents of a particular embodiment of a radio access node 700 that may be configured to protect downlink transmissions in a cell it is serving, (when operating in a potential victim cell) and/or in a nearby cell served by another radio access node (when operating in a potential aggress Or cell). As shown in FIG. 7, the example embodiment of network node 700 includes a node processor 702, a node memory 704, a communication interface 706, an antenna 708, a transmitter 710, and a receiver 712.

Node processor 702 may represent or include any form of processing component, including dedicated microprocessors, general-purpose computers, or other forms of electronic circuitry capable of processing electronic information. Examples of node processor 702 include field-programmable gate arrays (FPGAs), programmable microprocessors, digital signal processors (DSPs), application-specific integrated circuits (ASICs), and any other suitable specific- or general-purpose processors. Although FIG. 7 illustrates, for the sake of simplicity, an embodiment of network node 700 that includes a single node processor 702, network node 700 may include any number of node processors 702 configured to interoperate in any appropriate manner.

Node memory 704 stores configuration information obtained by radio access node 700. Node memory 704 may also store processor instructions for node processor 702, coding algorithms, transmission parameters, and/or any other data utilized by radio access node 700 during operation. Node memory 704 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 7, node memory 704 may include one or more physical components local to or remote from radio access node 700.

Communication interface 706 comprises electronic circuitry and other components suitable to permit radio access node 700 to communicate with other radio access nodes and/or other elements of access network 30 and core network 40. For example, in embodiments in which radio access node 700 exchanges coordination information with other network nodes in access network 30, communication interface 706 may represent circuitry capable of communicating over an X2 interface between radio access node 700 and other nodes of access network 30.

Antenna 708 represents any suitable conductor capable of receiving and transmitting wireless signals. Transmitter 710 transmits radiofrequency (RF) signals over antenna 708, and receiver 712 receives from antenna 708 RF signals transmitted by wireless communication devices 20. Although the example embodiment in FIG. 7 includes certain numbers and configurations of antennas, receivers, and transmitters, alternative embodiments of radio access node 700 may include any suitable number of these components. Additionally, transmitter 710, receiver 712, and/or antenna 708 may represent, in part or in whole, the same physical components. For example, particular embodiments of radio access node 700 include a transceiver representing both transmitter 710 and receiver 712.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for configuring a wireless transmission, the method comprising:
    obtaining (600), at a first network node serving a first cell, information pertaining to a type of an almost blank subframe (ABS) configuration to be used in a second cell;
    determining (608,610,612) based on the obtained information a transmission configuration for a downlink control channel carrying feedback information for one or more wireless communication devices in one or more candidate subframes in a restricted measurement pattern that satisfies a candidate condition that relates to transmissions in the ABS of the second cell, wherein the transmission configuration comprises transmission power level, transmission format, or both; and
    transmitting (620) feedback information for an uplink transmission to said one or more wireless communication devices using the determined transmission configuration.

2. The method of claim 1, wherein the type of ABS is MBSFN ABS and the candidate condition relates to the one or more candidate subframes in the first cell comprising ABS subframes in the second cell.

3. The method of claim 1, wherein determining the transmission configuration for the downlink control channel based on the obtained information comprises:
    determining a positive power margin (608) for the downlink control channel based on the obtained information; and
    determining a transmission power (610) for the downlink control channel such that the transmission power is equal to a sum of the power margin and a reference transmission power.

4. The method of claim 1, wherein:
    the downlink control channel comprises one of a plurality of feedback channels that are each assigned to one of a plurality of feedback channel groups;
    determining the transmission configuration based on the obtained information comprises determining a number of feedback control channels to be included in each of the feedback channel groups based on the obtained information; and
    transmitting feedback information comprises multiplexing feedback information from all of the channels in a first feedback channel group.

5. The method of claim 1, wherein:
    determining the transmission configuration based on the obtained information comprises determining one or more of a spreading factor size for the downlink control channel, a number of orthogonal frequency division multiplexing (OFDM) symbols to use for the feedback information, a number of control channel elements (CCE) for the downlink control channel, a modulation and coding scheme, or a coding rate for the downlink control channel; and
    transmitting feedback information comprises transmitting feedback information and/or a downlink control channel based on the determined transmission configuration.

6. The method of claim 1, wherein determining the transmission parameter based on the obtained information comprises:
  determining (604) whether the wireless communication device is using a restricted measurement pattern; and
  determining the transmission configuration based on whether the wireless communication device is using a restricted measurement pattern and on the obtained information.

7. The method of claim 1, wherein transmitting feedback information for an uplink transmission to the one or more wireless communication devices using the determined transmission configuration further comprises transmitting using the determined transmission configuration in subframes indicated for downlink measurements by a restricted measurement pattern.

8. The method of claim 1, wherein determining the transmission parameter based on the obtained information comprises:
  determining (606) that an interference condition is satisfied, wherein the interference condition relates to an amount of interference experienced by the wireless communication device; and
  determining the transmission configuration based on whether the interference condition is satisfied and on the obtained information.

9. The method of claim 8, wherein the interference condition relates to a radio measurement performed by the first network node or the wireless communication device.

10. The method of claim 8, wherein the interference condition relates to whether the second cell serves a closed subscriber group to which the wireless communication device does not belong.

11. The method of claim 8, wherein the interference condition relates to whether the wireless communication device is operating within a cell range expansion zone of a cell associated with the first network node.

12. The method of claim 1, wherein the determined transmission configuration comprises a first transmission configuration, and the method further comprises:
  transmitting (614) information indicating the first transmission configuration to a network node serving the second cell;
  configuring the network node serving the second cell to use a second transmission configuration in response to the transmitted information, wherein the second transmission configuration differs from the first transmission configuration; and
  transmitting information in the second cell using the second transmission configuration.

13. The method of claim 1, wherein:
  the wireless communication device comprises one of a plurality of wireless communication devices;
  the downlink control channel comprises one of a plurality of downlink control channels each associated with a respective wireless communication device;
  determining the transmission configuration based on the obtained information comprises:
    identifying a first group of wireless communication devices for which an interference condition is satisfied;
    determining based on the obtained information a first transmission configuration to use for downlink channels associated with wireless communication devices in the first group; and
  transmitting the feedback information comprises:
    transmitting feedback information to the first group of wireless communication devices using the first transmission configuration; and
    transmitting feedback information to the second group of wireless communication devices using a second transmission configuration.

14. An apparatus (700) for configuring communication in a wireless communication system, the apparatus comprising:
  a transmitter (710) configured to transmit feedback information to a wireless communication device in a first cell served by the apparatus; and
  a processor (702) configured to:
    obtain information pertaining to an almost blank subframe (ABS) configuration to be used in a second cell;
    determine based on the obtained information a transmission configuration for a downlink control channel carrying feedback information for one or more wireless communication devices, wherein the transmission configuration comprises transmission power level, transmission format, or both; and
    transmit feedback information for an uplink transmission to the one or more wireless communication devices using the determined transmission configuration.

15. The apparatus of claim 1, wherein the type of ABS is MBSFN ABS and the candidate condition relates to the one or more candidate subframes in the first cell comprising ABS subframes in the second cell.

16. The apparatus of claim 14, wherein the processor is configured to determine the transmission configuration for the downlink control channel based on the obtained information by:
  determining a positive power margin for the downlink control channel based on the obtained information; and
  determining a transmission power for the downlink control channel such that the transmission power is equal to a sum of the power margin and a reference transmission power.

17. The apparatus of claim 14, wherein the downlink control channel comprises one of a plurality of feedback channels that are each assigned to one of a plurality of feedback channel groups, and wherein the processor is configured to:
  determine the transmission configuration based on the obtained information by determining a number of feedback control channels to be included in each of the feedback channels based on the obtained information; and
  transmit feedback information by multiplexing feedback information from all of the channels in a first feedback channel group.

18. The apparatus of claim 14, wherein, the processor is configured to:
  determining the transmission configuration based on the obtained information comprises determining one or more of a spreading factor size for the downlink control channel, a number of orthogonal frequency division multiplexing (OFDM) symbols to use for the feedback information, a number of control channel elements (CCE) for the downlink control channel, a modulation and coding scheme, or a coding rate for the downlink control channel; and transmitting feedback information comprises transmitting feedback information and/or a downlink control channel based on the determined transmission configuration.

19. The apparatus of claim 14, wherein the processor is configured to transmit feedback information for an uplink transmission to said one or more wireless communication devices using the determined transmission configuration by transmitting using the determined transmission configuration in subframes indicated for downlink measurements by a restricted measurement pattern.

20. The apparatus of claim 14, wherein the processor is configured to determine the transmission configuration based on the obtained information by:
    determining whether the wireless communication device is using a restricted measurement pattern; and
    determining the transmission configuration based on whether the wireless communication device is using a restricted measurement pattern and on the obtained information.

21. The apparatus of claim 14, wherein the processor is configured to determine the transmission configuration based on the obtained information by:
    determining that an interference condition is satisfied, wherein the interference condition relates to an amount of interference experienced by the wireless communication device; and
    determining the transmission configuration based on whether the interference condition is satisfied and on the obtained information.

22. The apparatus of claim 21, wherein the interference condition relates to an interference measurement performed by the apparatus or the wireless communication device.

23. The apparatus of claim 21, wherein the interference condition relates to whether the second cell serves a closed subscriber group to which the wireless communication device does not belong.

24. The apparatus of claim 21, wherein the interference condition relates to whether the second cell serves a closed subscriber group to which the wireless communication device does not belong.

25. The apparatus of claim 14, wherein:
    the determined transmission configuration comprises a first transmission configuration;
    the processor is further configured to transmit information indicating the first transmission configuration to a network node serving the second cell to be used by the network node to configure a transmission in the second cell.

26. The apparatus of claim 14, wherein:
    the wireless communication device comprises one of a plurality of wireless communication devices;
    the downlink control channel comprises one of a plurality of downlink control channels each associated with a respective wireless communication device;
    the processor is configured to determine the transmission configuration based on the obtained information by:
        identifying a first group of wireless communication devices for which an interference condition is satisfied;
        determining based on the obtained information a first transmission configuration to use for downlink channels associated with wireless communication devices in the first group; and
    the processor is configured to transmit the feedback information by:
        transmitting feedback information to the first group of wireless communication devices using the first transmission configuration; and
        transmitting feedback information to the second group of wireless communication devices using a second transmission configuration.

27. A method for configuring a wireless transmission, the method comprising:
    obtaining, at a first network node serving a first cell, information pertaining to a type of an almost blank subframe (ABS) configuration to be used in a second cell;
    determining based on the obtained information a transmission configuration for a downlink control channel carrying feedback information for one or more wireless communication devices, wherein the downlink control channel is to be transmitted in at least one subframe in the first cell that does not overlap with any ABS subframes in the second cell, and wherein the transmission configuration comprises a transmission power level, a transmission format, or both; and
    transmitting feedback information for an uplink transmission to said one or more wireless communication devices using the determined transmission configuration.

28. An apparatus (700) for configuring communication in a wireless communication system, the apparatus comprising:
    a transmitter (710) configured to transmit feedback information to a wireless communication device in a first cell served by the apparatus; and
    a processor (702) configured to:
        obtain, at a first network node serving a first cell, information pertaining to a type of an almost blank subframe (ABS) configuration to be used in a second cell;
        determine based on the obtained information a transmission configuration for a downlink control channel carrying feedback information for one or more wireless communication devices, wherein the downlink control channel is to be transmitted in at least one subframe in the first cell that does not overlap with any ABS subframes in the second cell, and wherein the transmission configuration comprises a transmission power level, a transmission format, or both; and
        transmit feedback information for an uplink transmission to said one or more wireless communication devices using the determined transmission configuration.

* * * * *